United States Patent
Shen et al.

(10) Patent No.: US 10,421,093 B2
(45) Date of Patent: Sep. 24, 2019

(54) GLUE COATING DEVICE FOR LAYING STEALTH OPTICAL CABLES

(71) Applicant: Jiangsu Etern Company Limited, Jiangsu (CN)

(72) Inventors: Feng Shen, Jiangsu (CN); Xiaohong Chen, Jiangsu (KR); Honglei Yang, Jiangsu (CN); Zuguo Wei, Jiangsu (CN); Zifeng Yao, Jiangsu (CN); Danfeng Ling, Jiangsu (CN); Guijun Xia, Jiangsu (CN); Peijie Zhao, Jiangsu (CN)

(73) Assignee: Jiangsu Etern Company Limited, Jiangsu (CN)

( * ) Notice: Subject to any disclaimer, the term of this patent is extended or adjusted under 35 U.S.C. 154(b) by 62 days.

(21) Appl. No.: 15/739,437

(22) PCT Filed: Aug. 20, 2015

(86) PCT No.: PCT/CN2015/087654
§ 371 (c)(1),
(2) Date: Dec. 22, 2017

(87) PCT Pub. No.: WO2017/008367
PCT Pub. Date: Jan. 19, 2017

(65) Prior Publication Data
US 2018/0185870 A1    Jul. 5, 2018

(30) Foreign Application Priority Data
Jul. 10, 2015   (CN) .......................... 2015 1 0402234

(51) Int. Cl.
*B05C 1/02*   (2006.01)
*B05C 5/02*   (2006.01)
(Continued)

(52) U.S. Cl.
CPC ............... *B05C 1/027* (2013.01); *B05C 5/02* (2013.01); *B05C 17/00503* (2013.01);
(Continued)

(58) Field of Classification Search
CPC ..... B05C 1/027; B05C 5/02; B05C 17/00503; B05C 17/02; B05C 1/02; B05C 1/022;
(Continued)

(56) References Cited

U.S. PATENT DOCUMENTS 4,867,210 A * 9/1989 Montenieri, Sr. ........ H01R 4/70
                                                          141/98
4,932,565 A * 6/1990 Paradiso ........... B05C 17/00516
                                                          222/174

(Continued)

FOREIGN PATENT DOCUMENTS

CN    2801295 Y    8/2006
CN    202570527 U  12/2012
(Continued)

OTHER PUBLICATIONS

WIPO, Chinese International Search Authority, International Search Report and Written Opinion dated Apr. 14, 2016 in International Patent Application No. PCT/CN2015/087654, 12 pagDec. 18, 2017.

*Primary Examiner* — David J Walczak
(74) *Attorney, Agent, or Firm* — Masuvalley & Partners

(57) ABSTRACT

A glue coating device for laying stealth optical cables, comprising an outer housing and an inner housing sheathed inside the outer housing. A glue chamber is provided inside the inner housing. One end of the outer housing is a mounting end and the other end is a glue injection end by which the device is mounted on a glue injection gun. A glue injection zone is provided at an end surface of the glue injection end and runs through the glue chamber. The glue injection end has a front preprocessor which comprises two
(Continued)

separating and guiding sides forming an angle of 120° therebetween and protruding from the outer housing. A cable positioning groove is provided on the end surface of the outer housing. The device is simple in structure, convenient for constructing, and provides quantitative glue injection and has a favorable coating effect.

7 Claims, 2 Drawing Sheets

(51) Int. Cl.
  *G02B 6/46* (2006.01)
  *G02B 7/02* (2006.01)
  *B05C 17/005* (2006.01)
  *G02B 6/44* (2006.01)
  *B05C 17/00* (2006.01)

(52) U.S. Cl.
  CPC ............... *G02B 6/46* (2013.01); *G02B 7/025* (2013.01); *B05C 17/002* (2013.01); *G02B 6/4466* (2013.01)

(58) Field of Classification Search
  CPC .. B05C 1/025; B05C 9/08; B05C 9/10; B05C 17/00526; B05C 17/00523; G02B 6/46; G02B 7/025; G02B 6/4466; G02B 6/48; G02B 6/4463
  See application file for complete search history.

(56) References Cited

U.S. PATENT DOCUMENTS

| | | | |
|---|---|---|---|
| 5,324,305 A * | 6/1994 | Kanner | A61B 17/00491 |
| | | | 222/146.2 |
| 6,196,746 B1 * | 3/2001 | Onischuk | A47G 27/0487 |
| | | | 401/261 |
| 6,464,115 B2 * | 10/2002 | Wemyss | B05C 17/00516 |
| | | | 222/567 |
| 2013/0343803 A1 | 12/2013 | Wang | |

FOREIGN PATENT DOCUMENTS

| | | |
|---|---|---|
| CN | 203304149 U | 11/2013 |
| CN | 203944527 U | 11/2014 |
| CN | 204405917 U | 6/2015 |
| CN | 204866391 U | 12/2015 |
| SU | 1219168 A | 3/1986 |

* cited by examiner

GLUE COATING DEVICE FOR LAYING STEALTH OPTICAL CABLES

RELATED APPLICATIONS

This application is the U.S. National Phase of and claims priority to International Patent Application No. PCT/CN2015/087654, International Filing Date Aug. 20, 2015, entitled Glue Coating Device For Laying Transparent Optical Cables; which claims benefit of Chinese Application No. 201510402234.3 filed Jul. 10, 2015; both of which are incorporated herein by reference in their entireties.

FIELD OF THE INVENTION

The present invention relates to the technical field of optical fiber cables, and more particularly to a glue coating device for laying stealth optical cables.

DESCRIPTION OF THE RELATED ART

With the implementation of national policies such as "Broadband China", "Internet+" and "Raise the net speed, Reduce the cost", operators are accelerating the deployment of fiber to the home. The original FTTX+LAN access mode will be replaced by fiber to the home, and broadband users are experiencing accelerated network upgrading. During the upgrading, operators and users are confronted with the problem of user-side cable replacement. The rapid shift from original wiring systems to new wiring systems is the key for operators to attract users. Some users don't choose to upgrade the network, the main reasons are in that: firstly, dismantling of old wiring may damage interior decoration and it takes a long time; secondly, when open wire laying is adopted, the use of indoor optical cables of strong colors such as black, white and yellow may damage the decoration effect.

In view of the above, an invisible optical cable access system is provided to effectively solve the above main problems. The invisible optical cable access system does not need dismantling of original wiring, requires less construction time, and does not damage the decoration effect. For the optical fiber, a micro-cable structure is used, which has good bending performance and can be laid at concealed positions such as wall corner, crack of the door, window sill and skirting line that do not easily damage the decoration effect. The cable is fixed by means of glue coating. Such a access system with features of quick construction and quick service provisioning has become the mainstream access mode that operators are promoting. In addition, the stealth optical cable access mode can be used for rapid capacity expansion of commercial users, service provisioning in old communities, as well as emergency response to sudden failure.

Currently, glue laying of the stealth optical cables mainly utilize room-temperature curing and hot-melting. During glue laying, a glue injection gun is used to directly inject glue to fix the cable. Before the glue injection for fixing, the cable is preliminarily fixed with an instant adhesive, a special ornament adhesive tape is used to protect the glue laying path. Then, the glue is injected to fix the cable. Such a laying method requires much manpower and time. The glue is injected using a general glue injection tip, the amount of glue injected is determined manually, and quantitative glue injection cannot be implemented. After glue curing, bending, embossing, recessing, fracturing and falling of the glue easily occur, and thus twice construction is needed. In addition, unwanted objects such as dust, decoration residues and greasy dirt at some concealed positions such as the wall corner, crack of the door, window sill and skirting line may form impurity particles within the glue with the ageing of the glue, and this seriously affects the invisibility effect. In view of the above problems in the construction process, there is a need to provide a device that can solve the above problems.

SUMMARY OF THE INVENTION

To solve the above technical problems, the present invention provides a glue coating device for laying stealth optical cables. The device is simple in structure, convenient for constructing, and provides quantitative glue injection and has a favorable coating effect.

To achieve the above purposes, the present invention utilizes the following technical solutions.

The invention provides a glue coating device for laying stealth optical cables, the device comprises an outer housing and an inner housing sheathed inside the outer housing, the outer housing has one end being a mounting end and the other end being a glue injection end, and the outer housing is mounted on a glue injection gun by the mounting end. A glue chamber is provided in the inner housing. A glue injection zone is provided at an end surface of the glue injection end, and the glue injection zone runs through the glue chamber. The glue injection end is provided with a front preprocessor for removing any unwanted object on a cable laying path. The front preprocessor is disposed on a side surface of the outer housing and formed integrally with the outer housing. The front preprocessor comprises two separating and guiding sides forming an angle of 120° therebetween and protruding from the outer housing. A cable positioning groove is provided on an end surface of the outer housing at a side of the glue injection zone.

In a preferred embodiment, the cable positioning groove is a U-shaped groove, and the opening direction of the U-shaped groove is consistent with that of the glue injection zone. An angle of 30° is formed between the bottom of the U-shaped groove and the bottom side of the outer housing.

In a preferred embodiment, the device also comprises positioning parts arranged at the glue injection end of the outer housing, and the positioning parts are provided at two sides of the glue injection zone. An acute angle is formed between a positioning end surface of the positioning part and a glue injection surface of the glue injection zone.

In a preferred embodiment, the positioning part comprises a positioning block and a compression spring. A convex-shaped positioning groove is opened at a position where the positioning part is disposed, the compression spring is arranged in the convex-shaped positioning groove, and the positioning block is pressed against the compression spring.

In a preferred embodiment, the glue chamber comprises, in sequence from the mounting end to the glue injection end: a glue injection cavity, a primary pressure booster cavity, a glue pressure stabilizing cavity, a glue flow control cavity and the glue injection zone.

In a preferred embodiment, a heat-conduction heating block is sheathed around the glue injection cavity, the end of the outer housing at which the heat-conduction heating block is disposed is the mounting end, and the mounting end is configured as a mounting base. The mounting base is mounted on the glue injection gun by an mounting base body, and the mounting base body is formed integrally with the outer housing.

In a preferred embodiment, a flow control unit is provided within the glue flow control cavity, and the flow control unit is connected to the outer housing through internal threads.

The glue flow control cavity and the outer housing form a closed space, and the flow control unit is a cylinder and a milling flute extends through the cylinder. A glue pathway is formed from the glue pressure stabilizing cavity to the glue injection zone by adjusting the position of the milling flute.

By means of the above technical solutions, as compared with the prior art the present invention has the following advantages:

1. The coating device of the present invention utilizes a front preprocessor to effectively remove any unwanted object on the cable laying path, and effective cleaning of unwanted objects is achieved by means of the two separating and guiding sides forming an angle of 120° therebetween, thereby effectively ensuring the invisibility effect after glue curing and preventing the glue from falling.

2. By means of a self-centering positioning device of the cable positioning groove, a cable to be laid is positioned below the glue injection zone, and self-positioning is completed. Glue from the glue chamber is coated. In this way, cable laying and glue coating are completed at the same time, and preprocessing of the cable and other assistance of laying paths are no longer required, thereby improving construction efficiency.

3. The consistency between the glue coating path and the positions of reference (crack of the door, wall corner, window sill or skirting line) can be achieved by means of the positioning block, so that the defect of bending for a glue coating path can be avoided.

4. By means of the glue pressure boosting, pressure stabilizing, and flow control components in the glue chamber, metering of the glue during glue coating can be ensured, thereby avoiding uneven or interrupted glue.

5. By means of the glue mounting base, the device can be quickly installed onto the glue injection gun, and the heat-conduction heating block on the mounting base is suitable for the use of room-temperature curing glue and hot-melt glue.

BRIEF DESCRIPTION OF THE DRAWINGS

In order to illustrate the technical solutions in the embodiments of the present invention more clearly, the accompanying drawings used in the embodiments will be described simply. Obviously, the accompanying drawings described hereinafter only are some embodiments of the present invention, and other drawings also can be obtained without creative work for those skilled in the art.

wherein, 1—mounting base (mounting end), 11—heat-conduction heating block, 12—mounting base body, 2—outer housing, 21—side surface of the outer housing, 22—front preprocessor, 220—separating and guiding side, 23—cable positioning groove, 3—positioning part, 31—positioning groove, 32—compression spring, 33—positioning block, 4—glue chamber, 41—glue injection cavity, 42—glue storage cavity, 43—primary pressure booster cavity, 44—glue pressure stabilizing cavity, 45—glue flow control cavity, 450—flow control unit, 46—glue injection zone.

DETAILED DESCRIPTION OF THE PREFERRED EMBODIMENTS

The technical solutions in the embodiments of the present invention will be described clearly and completely in combination with the accompanying drawings. Obviously, the described embodiments are parts of the embodiments of the present invention, instead of all of the embodiments. On the basis of the embodiments in the present invention, all other embodiments obtained by those skilled in the art without creative work belong to the protection scope of the present invention.

Embodiment

Figure 1:
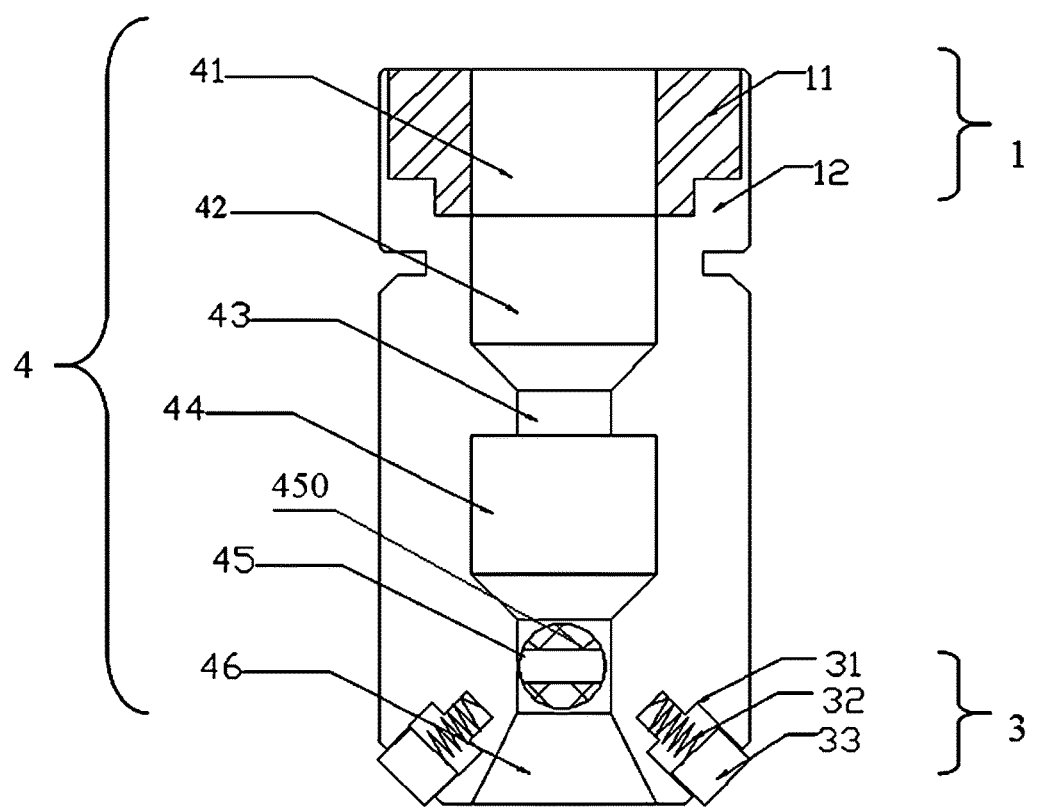
FIG. 1 is a schematic view of the glue coating device according to the invention.
Figure 2:
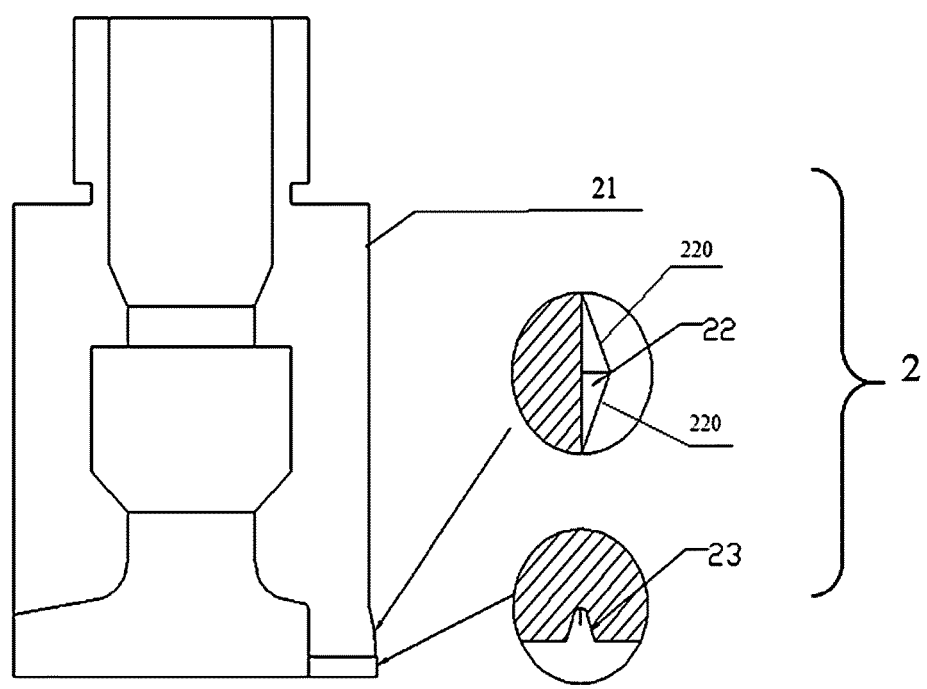
FIG. 2 is a side view of FIG. 1.

As shown in FIGS. 1-2, this embodiment discloses a glue coating device for laying stealth optical cables. The device comprises an outer housing 2 and an inner housing sheathed inside the outer housing 2. A glue chamber 4 is provided inside the inner housing. One end of the outer housing 2 is a mounting end 1, and the other end of the outer housing 2 is a glue injection end. The glue coating device is installed on a glue injection gun by the mounting end 1. The glue is injected into the glue chamber 4 by the glue injection gun, and the glue is coated through the glue injection end.

Specifically, as shown in FIG. 1, from the mounting end to the glue injection end, the glue chamber comprises in sequence: a glue injection cavity 41, a glue storage cavity 42, a primary pressure booster cavity 43, a glue pressure stabilizing cavity 44, a glue flow control cavity 45 and a glue injection zone 46.

The glue injection zone 46 is provided at an end surface of the glue injection end, that is, a glue outlet of the glue injection zone 46 is located at the end surface of the glue injection end. A heat-conduction heating block 11 is sheathed around the glue injection cavity 41. The end of the outer housing where the heat-conduction heating block 11 is arranged is the mounting end. The mounting end is configured as a mounting base 1. The mounting base 1 is installed onto the glue injection gun by means of a mounting base body 12. The mounting base body 12 and the outer housing are integrated as one-piece. By means of the glue mounting base, the glue coating device can be quickly installed onto the glue injection gun. The heat-conduction heating block on the mounting base is suitable for the room-temperature curing glue and hot-melt glue.

A flow control unit 450 is provided within the glue flow control cavity 45. The flow control unit 450 is connected to the outer housing 2 through internal threads. The glue flow control cavity 45 and the outer housing 2 form a closed space. The flow control unit is a cylinder through which a milling flute extends. By adjusting the position of the milling flute, a glue pathway is formed from the glue pressure stabilizing cavity 44 to the glue injection zone 46.

The glue coating device is installed onto the glue injection gun by means of the mounting base 1. The glue is injected into the glue injection cavity 41 by the glue injection gun, and is pushed into the glue storage cavity 42. Under the pushing force of the glue injection gun, the glue is stored in the glue storage cavity 42, and this ensures the stable injection of the glue. After the pressure boosting of the primary pressure booster cavity 43, the glue enters the glue pressure stabilizing cavity 44. Under the action of the primary pressure booster cavity 43 and the glue flow control cavity 45, a stable-pressure glue area is formed. Under the flow control of the glue flow control cavity 45, the glue enters the glue injection zone 46 for coating.

The principle of flow control in the glue flow control cavity 45 lies in that a cylinder having a milling flute running through therein is used, the glue flow control cavity 45 and the outer housing 2 form a closed space, and a glue pathway is formed from the glue pressure stabilizing cavity 44 to the glue injection zone 46 by adjusting the position of the milling flute, to effectively control the flow and pressure, thereby ensuring that the amount of glue in the glue injection zone 46 is sufficient for effective coating. The flow control unit 450 in the glue flow control cavity 45 is connected to the outer housing 2 through internal threads, and the flow control is achieved by rotating the flow control unit. The glue flow control unit is formed by injection molding of fluoroplastic, to provide a desirable strength and good lubrication, reduce the friction coefficient and ensure stable pressure and flow of the glue.

To effectively clean unwanted objects and ensure the stealth effect after glue curing, and overcome the defect of glue falling, in this embodiment, a front preprocessor 22 is arranged at the glue injection end for removing any unwanted object on a cable laying path. The front preprocessor is disposed on a side surface 21 of the outer housing, and the front preprocessor is formed integrally with the outer housing. The front preprocessor 22 includes two separating and guiding sides 220 forming an angle of 120° therebetween and protruding from the outer housing 2.

A cable positioning groove 23 is provided on the end surface of the outer housing 2, and the cable positioning groove 23 is disposed at one side of the glue injection zone 46. The cable positioning groove is a U-shaped groove, and the opening direction of the U-shaped groove is consistent with that of the glue injection zone. An angle of 30° is formed between the bottom of the U-shaped groove and the bottom side of the outer housing.

By means of a self-centering positioning device of the cable positioning groove, a cable to be laid is positioned below the glue injection zone, and self-positioning is completed. Glue from the glue chamber is coated. In this way, cable laying and glue coating are completed at the same time, and preprocessing of the cable and other assistance for laying are no longer required.

In this embodiment, the coating device further includes positioning parts 3 arranged at the glue injection end of the outer housing 2. The positioning parts 3 are provided at two sides of the glue injection zone 46. An acute angle is formed between a positioning end surface of the positioning part 3 and a glue injection surface of the glue injection zone 46.

The positioning part 3 includes a positioning block 33 and a compression spring 32. A convex-shaped positioning groove is opened at the position where the positioning part is disposed, the compression spring 32 is arranged in the positioning groove 31, and the positioning block 33 is pressed against the compression spring 32. The consistency between the glue coating path and the positions of reference (crack of the door, wall corner, window sill or skirting line) can be achieved by means of the positioning block, such that the defect of bending for a glue coating path can be avoided.

The abovementioned description of the disclosed embodiments enables those skilled in the art to implement or use the present invention. Multiple modifications to these embodiments are obvious to those skilled in the art, and general principles defined herein can be implemented in other embodiments without departing from the spirit or scope of the present invention. Therefore, the present invention will not be limited to these embodiments illustrated herein, but needs to be in line with the widest scope consistent with the principles and novel features disclosed herein.

What is claimed is:

1. A glue coating device for laying stealth optical cables, comprising:

an outer housing with one end being a mounting end and the other end being a glue injection end, and the outer housing being mounted on a glue injection gun by the mounting end; and
    an inner housing sheathed inside the outer housing, and a glue chamber being provide within the inner housing;
    wherein a glue injection zone is provided at an end surface of the glue injection end, and the glue injection zone is in communication with other parts of the glue chamber;
    the glue injection end is provided with a front preprocessor for removing any unwanted object on a cable laying path, the front preprocessor being disposed on a side surface of the outer housing and formed integrally with the outer housing, the front preprocessor comprising two separating and guiding sides forming an angle of 120° therebetween and protruding from the outer housing; and
    a cable positioning groove is provided on the end surface of the outer housing at a side of the glue injection zone.

2. The glue coating device for laying stealth optical cables as claimed in claim 1, wherein the cable positioning groove is a U-shaped groove, an opening direction of the U-shaped groove is consistent with a direction along which the glue is injected, and an angle of 30° being formed between the bottom of the U-shaped groove and the end surface of the outer housing.

3. The glue coating device for laying stealth optical cables as claimed in claim 2, wherein the device also comprises positioning parts arranged at the glue injection end of the outer housing and at two sides of the glue injection zone, and an acute angle being formed between a positioning end surface of the positioning parts and the end surface of the glue injection zone respectively.

4. The glue coating device for laying stealth optical cables as claimed in claim 3, wherein each positioning part comprises a positioning block and a compression spring, a convex-shaped positioning groove is opened at a position where the positioning part is disposed, the compression spring being arranged in the convex-shaped positioning groove, and the positioning block being pressed against the compression spring.

5. The glue coating device for laying stealth optical cables as claimed in claim 1, wherein the glue chamber comprises, in sequence from the mounting end to the glue injection end: a glue injection cavity, a primary pressure booster cavity, a glue pressure stabilizing cavity, a glue flow control cavity and the glue injection zone.

6. The glue coating device for laying stealth optical cables as claimed in claim 5, wherein a heat-conduction heating block is sheathed around the glue injection cavity, the end of the outer housing at which the heat-conduction heating block is disposed is the mounting end which is configured as a mounting base, the mounting base is mounted on the glue injection gun by an mounting base body, and the mounting base body being formed integrally with the outer housing.

7. The glue coating device for laying stealth optical cables as claimed in claim 5, wherein a flow control unit is provided within the glue flow control cavity, the flow control unit being connected to the outer housing through internal threads, the flow control unit being a cylinder through which a milling flute extends, and a glue pathway being formed from the glue pressure stabilizing cavity to the glue injection zone by adjusting the position of the milling flute.

* * * * *